US012551033B1

(12) United States Patent
Walden

(10) Patent No.: US 12,551,033 B1
(45) Date of Patent: Feb. 17, 2026

(54) BAY WINDOW AQUARIUM KIT

(71) Applicant: Bonita Walden, Portsmouth, VA (US)

(72) Inventor: Bonita Walden, Portsmouth, VA (US)

(*) Notice: Subject to any disclaimer, the term of this patent is extended or adjusted under 35 U.S.C. 154(b) by 434 days.

(21) Appl. No.: 18/124,027

(22) Filed: Mar. 21, 2023

(51) Int. Cl.
A47F 11/06 (2006.01)

(52) U.S. Cl.
CPC .................... A47F 11/06 (2013.01)

(58) Field of Classification Search
CPC .... A47F 11/06; G09F 2019/081; A63H 23/16
See application file for complete search history.

(56) References Cited

U.S. PATENT DOCUMENTS

| | | | |
|---|---|---|---|
| 1,790,531 A | 1/1931 | Torhey | |
| 3,324,573 A * | 6/1967 | Lavallee | G09B 23/00 434/300 |
| 3,975,845 A * | 8/1976 | Mellard | A63H 13/20 40/430 |
| 4,578,044 A * | 3/1986 | Saitoh | A63H 33/26 446/156 |
| 4,691,459 A | 9/1987 | Butler | |
| 5,090,357 A * | 2/1992 | Pucci | A01K 63/006 30/106 |
| D327,233 S * | 6/1992 | McClellan | D11/131 |
| 5,337,701 A * | 8/1994 | Syers | A01K 63/006 119/251 |
| 5,463,826 A * | 11/1995 | Horiuchi | A63H 33/26 40/426 |
| 5,749,320 A * | 5/1998 | Sydenstricker | A01K 63/006 119/253 |
| 5,855,982 A * | 1/1999 | Wechsler | A01K 63/006 47/69 |
| 6,148,770 A * | 11/2000 | Lin | G09F 19/08 40/426 |
| 6,190,019 B1 * | 2/2001 | Hess | A01K 63/006 362/101 |
| 6,438,072 B1 * | 8/2002 | Tsai | A01K 63/003 368/228 |

(Continued)

FOREIGN PATENT DOCUMENTS

| | | | | |
|---|---|---|---|---|
| CN | 112967640 A * | 6/2021 | | G09F 19/08 |
| DE | 3618952 A1 * | 12/1987 | | G09F 19/08 |

(Continued)

OTHER PUBLICATIONS

"How to make a Window Aquarium on Hands on Crafts for Kids" ksproductiontv, https://www.youtube.com/watch?v=8jcODWT5myU (Year: 2013).*

Primary Examiner — Magdalena Topolski

(57) ABSTRACT

The bay window aquarium kit is a kit. The bay window aquarium kit is a decorative structure. The bay window aquarium kit is configured for use with a window structure. The bay window aquarium kit simulates an aquatic environment. The bay window aquarium kit includes a plurality of decorative puppets, a sea floor structure, a plurality of illumination structure, and a sheer structure. The plurality of decorative puppets and the sea floor structure form the indicia presented by the bay window aquarium kit. The plurality of illumination structures and the sheer structure simulate the lighting of an aquatic environment. The bay window aquarium kit mounts in the window structure such that the bay window aquarium kit is visible from the interior and the exterior of a building.

7 Claims, 4 Drawing Sheets

(56) References Cited

U.S. PATENT DOCUMENTS

| | | | |
|---|---|---|---|
| 6,439,163 B1 | 8/2002 | Martin | |
| 6,665,964 B2 | 12/2003 | Klotz | |
| 6,699,092 B1 * | 3/2004 | Cimerman | A63H 23/00 |
| | | | 446/153 |
| 6,742,477 B1 * | 6/2004 | Marraudino | A01K 63/006 |
| | | | 119/267 |
| 7,243,613 B2 * | 7/2007 | Holms | A01K 63/003 |
| | | | 119/248 |
| 7,527,542 B2 * | 5/2009 | Collins | A63F 7/045 |
| | | | 40/406 |
| 7,833,106 B2 | 11/2010 | Zhu | |
| 7,836,853 B2 * | 11/2010 | Locklear | A01K 63/006 |
| | | | 119/247 |
| 8,550,638 B2 * | 10/2013 | Shine | A47F 11/06 |
| | | | 348/789 |
| 10,223,605 B2 | 3/2019 | Tyson | |
| 10,337,719 B2 * | 7/2019 | Chien | B44C 5/00 |
| 10,561,121 B2 * | 2/2020 | Cohen | B65D 11/20 |
| 10,598,323 B1 * | 3/2020 | Schaak | G09F 19/02 |
| 2009/0147502 A1 * | 6/2009 | Aleman | A47F 3/001 |
| | | | 362/310 |

FOREIGN PATENT DOCUMENTS

| | | | | |
|---|---|---|---|---|
| GB | 2522053 | | 3/2017 | |
| JP | H1157231 A | * | 3/1999 | A63H 23/16 |
| KR | 20080003814 U | * | 9/2008 | A01K 63/06 |
| KR | 20100028780 A | * | 3/2010 | B44C 5/06 |
| WO | WO-2022104140 A2 | * | 5/2022 | A01K 63/006 |

\* cited by examiner

BAY WINDOW AQUARIUM KIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of simulated aquaria and terraria. (A01K63/003)

SUMMARY OF INVENTION

The bay window aquarium kit is a kit. The bay window aquarium kit is a decorative structure. The bay window aquarium kit is configured for use with a window structure. The bay window aquarium kit simulates an aquatic environment. By simulating an aquatic environment is meant that the bay window aquarium kit presents an image of indicia that stimulate a sentiment of a naturally occurring aquatic environment in an individual viewing the bay window aquarium kit. The bay window aquarium kit comprises a plurality of decorative puppets, a sea floor structure, a plurality of illumination structure, and a sheer structure. The plurality of decorative puppets and the sea floor structure form the indicia presented by the bay window aquarium kit. The plurality of illumination structures and the sheer structure simulate the lighting of an aquatic environment. The bay window aquarium kit mounts in the window structure such that the bay window aquarium kit is visible from the interior and the exterior of a building.

These together with additional objects, features and advantages of the bay window aquarium kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the bay window aquarium kit in detail, it is to be understood that the bay window aquarium kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bay window aquarium kit.

It is therefore important that the claims be regarded as including such equivalent construction insofar as they do not depart from the spirit and scope of the bay window aquarium kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
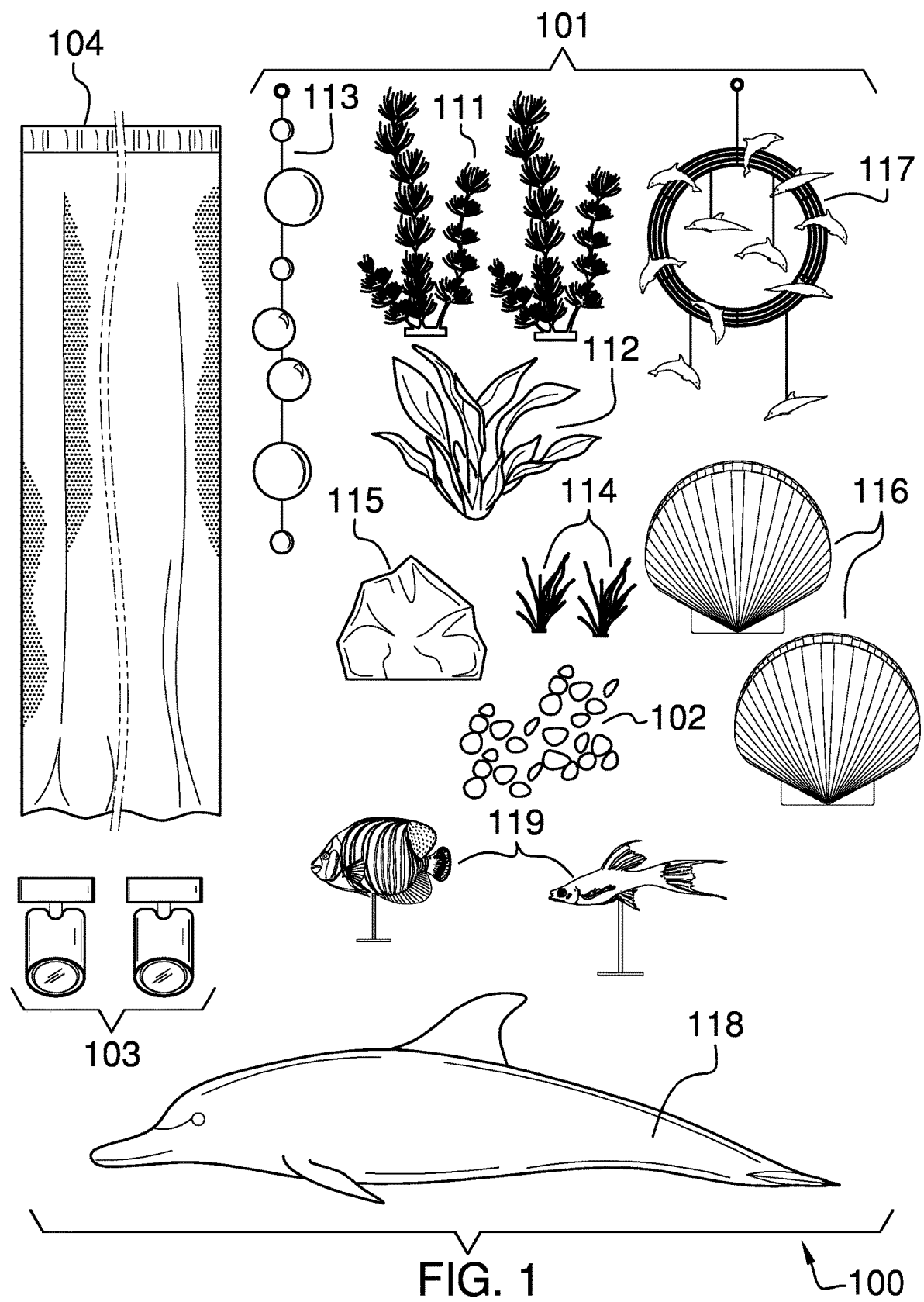
FIG. 1 is a kit view of an embodiment of the disclosure.
Figure 2:
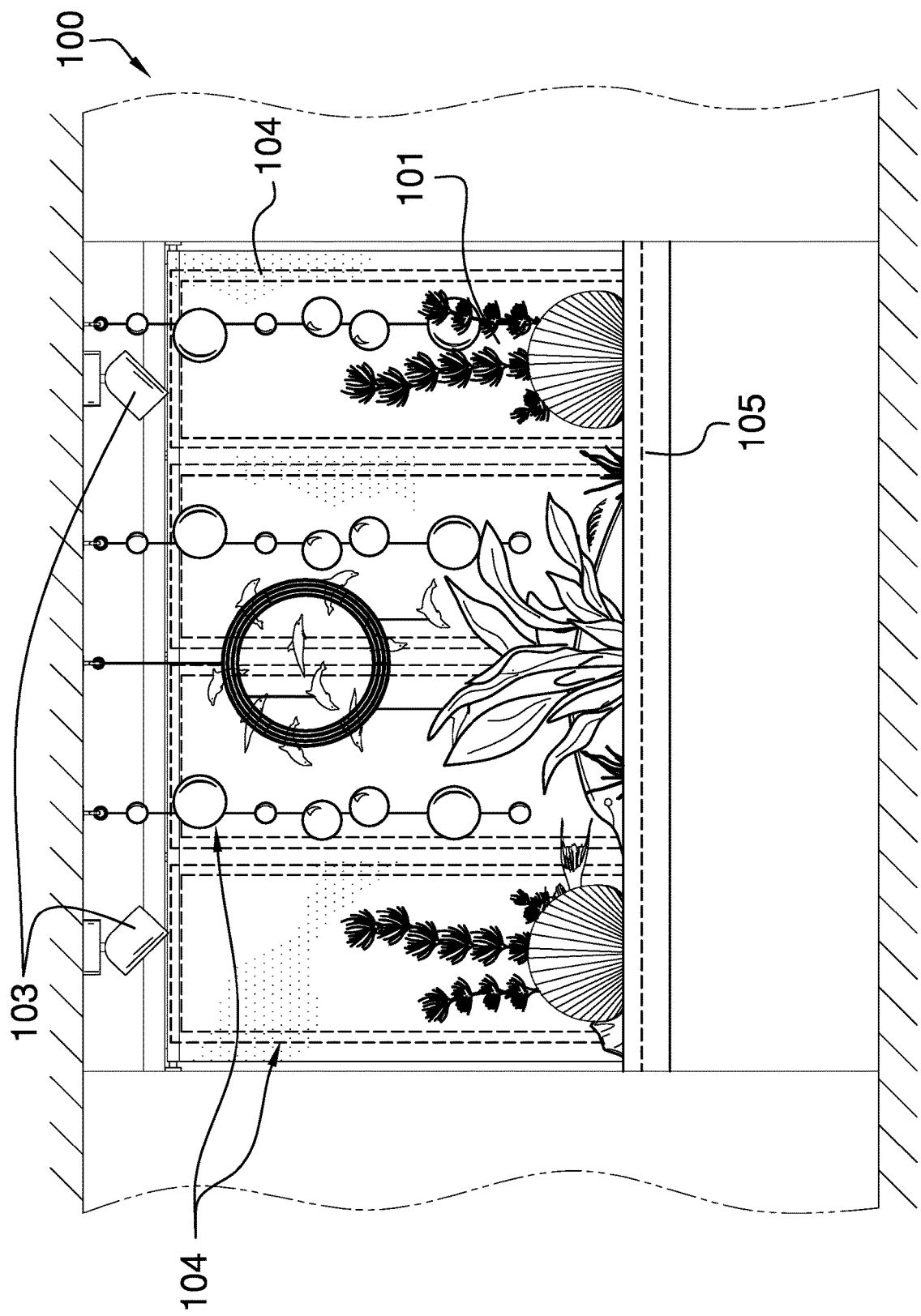
FIG. 2 is a front view of an embodiment of the disclosure.
Figure 3:
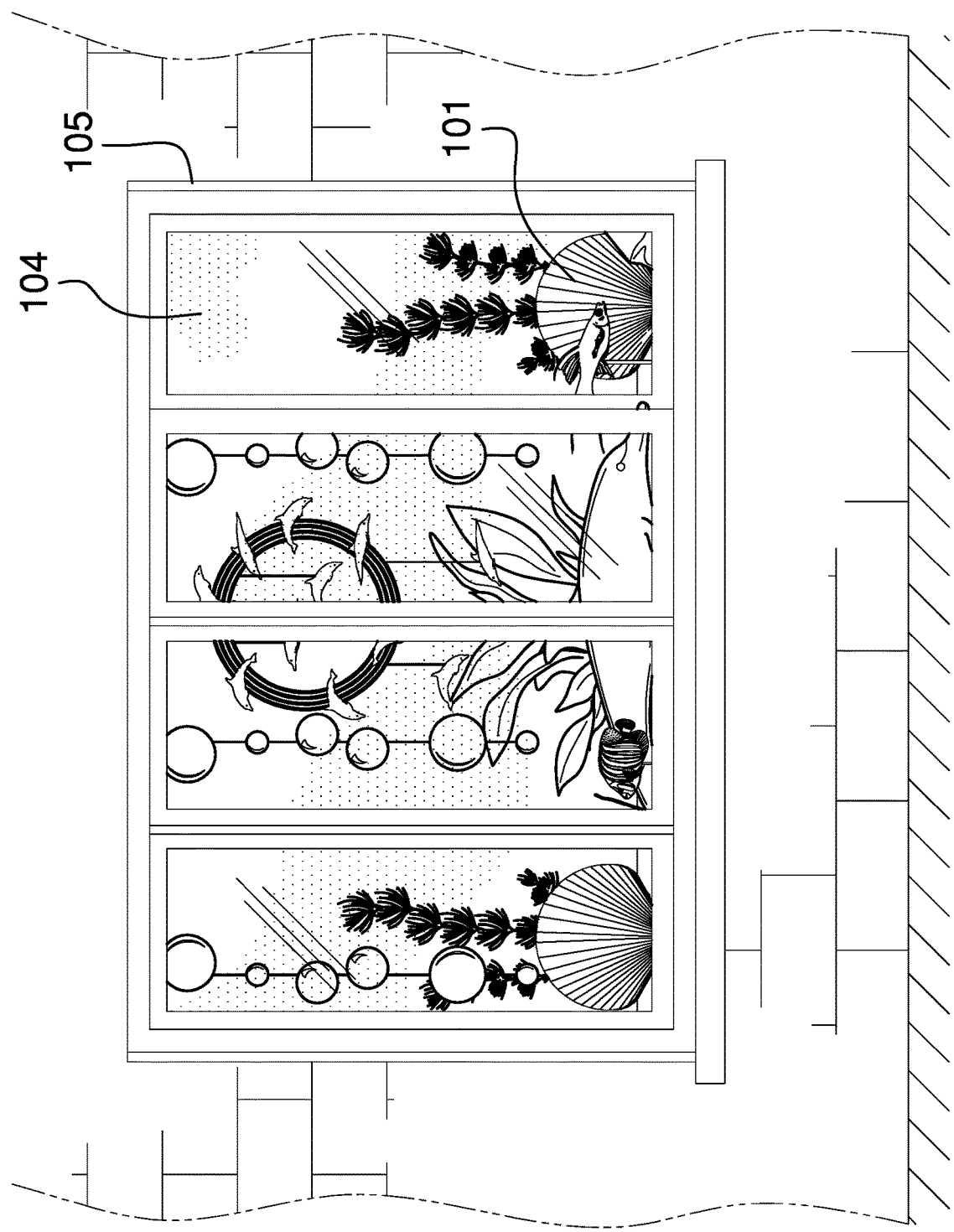
FIG. 3 is an in-use view of an embodiment of the disclosure.
Figure 4:
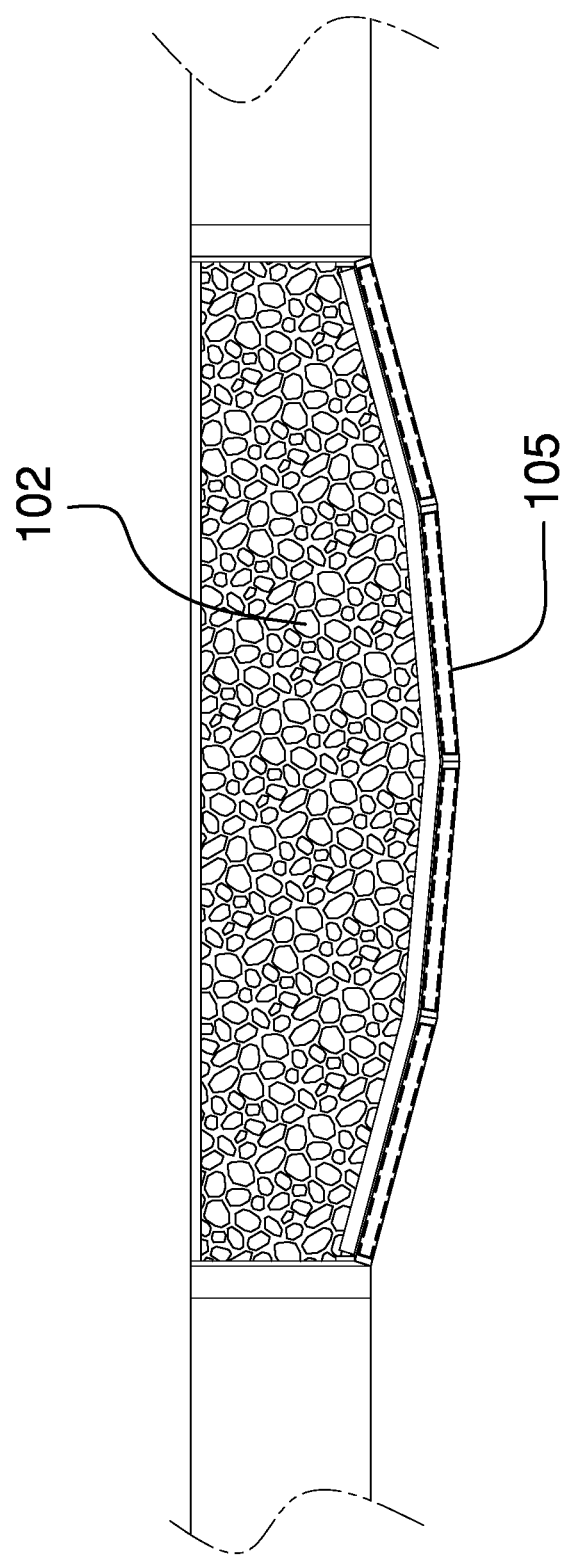
FIG. 4 is a top view of an embodiment of the disclosure.

Detailed reference will now be made to one or more potential embodiments of the disclosure, which are illustrated in FIGS. 1 through 4.

The bay window aquarium kit 100 (hereinafter invention) is a kit. The invention 100 is a decorative structure. The invention 100 is configured for use with a window structure 105.

The invention 100 simulates an aquatic environment. By simulating an aquatic environment is meant that the invention presents an image of indicia that stimulate a sentiment of a naturally occurring aquatic environment in an individual viewing the invention 100. The invention 100 comprises a plurality of decorative puppets 101, a sea floor structure 102, a plurality of illumination structure, and a sheer structure 104. The plurality of decorative puppets 101 and the sea floor structure 102 form the indicia presented by the invention 100. The plurality of illumination structures 103 and the sheer structure 104 simulate the lighting of an aquatic environment. The invention 100 mounts in the window structure 105 such that the invention 100 is visible from the interior and the exterior of a building. The window structure 105 is a window. The window is defined elsewhere in this disclosure.

The plurality of decorative puppets 101 and the sea floor structure 102 combine to form the full decorative structure of the invention 100. The plurality of decorative puppets 101 comprises a collection of decorative puppets. Each decorative puppet selected from the plurality of decorative puppets 101 is a puppet. Each selected decorative puppet presents an image of a first set of one or more indicia. Each of the first set one or more indicia stimulates the sentiment of a component of a natural aquatic environment. The position of each decorative puppet selected from the plurality of decorative puppets 101 is selected such that the plurality of decorative puppets 101 are visible through the window structure 105. Each selected decorative puppet is suspended within the window structure 105 such that the plurality of decorative puppets 101 appear to be floating in water.

The sea floor structure 102 is a mat like covering. The form factor of the sea floor structure 102 is selected such that the sea floor structure 102 presents an image of second set of one or more indicia. Each of the second set of one or more indicia stimulates the sentiment of the gravel bed of a natural aquatic environment. The sea floor structure 102 rests on the inferior structure of the window structure 105.

The plurality of illumination structures 103 and the sheer structure 104 combine to illuminate the decorative structures of the invention 100. The plurality of illumination structures 103 provides and controls the illumination used to highlight the images presented by the plurality of decorative puppets 101 and the sea floor structure 102. Each illumination structure selected from the plurality of illumination structures 103 is a lamp. The plurality of illumination structures 103 combine to present an illumination that is consistent with the appearance of naturally occurring light when viewed from beneath the water.

The sheer structure 104 is a sheer textile structure. The sheer structure 104 is placed between the plurality of decorative puppets 101 and the interior surface of the window structure 105. The sheer structure 104 diffuses the light passing through the sheer structure 104 such that the boundaries of each decorative puppet selected from the plurality of decorative puppets 101 is slightly diffused in a manner that is consistent with viewing the selected decorative puppet from underwater. The sheer structure 104 emulates the lack of clarity of objects as they appear from under water.

The plurality of decorative puppets 101 comprises one or more aquatic plant puppets 111, one or more seaweed puppets 112, one or more bubble puppets 113, one or more sea grass puppets 114, one or more rock puppets 115, one or more seashell puppets 116, one or more school of dolphins puppets 117, one or more dolphin puppets 118, and one or more aquarium fish puppets 119.

Each aquatic plant puppet selected from the one or more aquatic plant puppets 111 is a puppet. Each selected aquatic plant puppet presents an image of one or more indicia that stimulate the sentiment of a naturally occurring plant that is found in an aquatic environment.

Each seaweed puppet selected from the one or more seaweed puppets 112 is a puppet. Each selected seaweed puppet presents an image of one or more indicia that stimulate the sentiment of a naturally occurring macroalgae that is found in an aquatic environment. The naturally occurring macroalgae is commonly referred to as seaweed.

Each bubble puppet selected from the one or more bubble puppets 113 is a puppet. Each selected bubble puppet presents an image of one or more indicia that stimulate the sentiment of a physical structure commonly referred to as a bubble. The bubble puppet selected from the one or more bubble puppets 113 is suspended within the decorative structure formed by the invention 100.

Each sea grass puppet selected from the one or more sea grass puppets 114 is a puppet. Each selected sea grass puppet presents an image of one or more indicia that stimulate the sentiment of a naturally occurring flowering plant that is found in an aquatic environment.

Each rock puppet selected from the one or more rock puppets 115 is a puppet. Each selected rock puppet presents an image of one or more indicia that stimulate the sentiment of a physical structure commonly referred to as a rock.

Each seashell puppet selected from the one or more seashell puppets 116 is a puppet. Each selected seashell puppet presents an image of one or more indicia that stimulate the sentiment of a physical structure commonly referred to as a seashell.

Each school of dolphins puppet selected from the one or more school of dolphins puppets 117 is a puppet. Each selected school of dolphins puppet presents an image of one or more indicia that stimulate the sentiment of a naturally occurring school of animals that are found in an aquatic environment. The indicia presented for each selected school of dolphins puppet stimulate the sentiment that the selected school of dolphins puppet are being seen from a distance.

Each individual dolphin puppet selected from the one or more dolphin puppets 118 is a puppet. Each selected individual dolphin puppet presents an image of one or more indicia that stimulate the sentiment of a single naturally occurring animal that is found in an aquatic environment.

Each aquarium fish puppet selected from the one or more aquarium fish puppets 119 is a puppet. Each selected aquarium fish puppet presents an image of one or more indicia that stimulate the sentiment of a single naturally occurring animal that is found in an aquatic environment.

The following definitions were used in this disclosure:

Building: As used in this disclosure, a building is a structure located a fixed position that forms one or more enclosable spaces. The building forms a space selected from the group consisting of a protected space or a protection space. A building is often referred to as a structure.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow and taking the shape of a container.

Decorative: As used in this disclosure, decorative is an adjective that refers to a first object or item that is used with a second object or item of the purpose of making the second object or item more interesting or attractive. Decorative will generally, but not necessarily, implies making the second object or item more visually attractive.

Environment: As used in this disclosure, an environment refers to the physical conditions surrounding an object. The term environment is often limited to the physical conditions that the object interacts with.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Image: As used in this disclosure, an image is an optical representation or reproduction of an indicia or of the appearance of something or someone. See indicia sentiment optical character recognition. See Label and Pattern.

Indicia: As used in this disclosure, the term indicia refers to a set of markings that identify a sentiment. See sentiment.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Illumination: As used in this disclosure, illumination refers to electromagnetic radiation contained with an area. Illumination is a synonym for light, particularly in cases where a measure of the amount of visible electromagnetic radiation in a space is called for. The verb form of illumination is to illuminate and is taken to mean the generation of an illumination.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Kit: As used in this disclosure, a kit is an assembly of a combination of instruments, equipment, or supplies that are dedicated or intended for use in a specific purpose. Depending on the context, a kit may further include the container within which the instruments, equipment, and supplies are stored.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Puppet: As used in this disclosure, a puppet is a three-dimensional figure resembling a human, animal or symbolic image that is used for decorative, entertainment, or educational purposes. A puppet is often called a doll.

Rock: As used in this disclosure, a rock is a naturally occurring solid phase structure. The rock is a geological structure formed from naturally occurring minerals. The rock is a rigid structure. The term rock can refer to both: a) the geological structure that originally formed the rock; and, b) the piece of the geological structure that has been removed from the geological structure. The term stone refers to a small rock. The rock can be formed from a single mineral or a plurality of minerals. The term gravel refers to a structure formed from a plurality of stones that are in a bulk solid phase.

Sentiment: As used in this disclosure, a sentiment refers to a symbolic meaning or message that is communicated through the use of an object or an image, potentially including a text based image. See image and optical character recognition.

Sheer: As used in this disclosure, sheer is noun refers to a fabric with a yarn density that results in the fabric being semi-transparent as opposed to opaque.

Simulation: As used in this disclosure, a simulation refers to an environment that imitates a physical process. The verb form of simulation is to simulate.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Tinted: As used in this this disclosure, a tinted object is an first object made of first transparent material that has been coated, treated, or processed with a second material that reduces the amount of light that passes through the transparent material of the first object while not significantly scattering the light that passes through the first transparent material such that object behind the first object would remain clearly visible. A tinted structure can be informally referred to as semitransparent.

Transparent: As used in this disclosure, transparent refers to a material that allows light to pass through the material without significant scattering such that an object can be clearly seen through the material.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Window: As used in this disclosure, a window is an opening in formed in a structure that is fitted with glass or other transparent material in a frame to that allows the passage of light through the structure.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A window aquarium kit comprising
a plurality of decorative puppets, a sea floor structure, a plurality of illumination structures, and a sheer structure;
wherein the plurality of decorative puppets and the sea floor structure form an indicia presented by the window aquarium kit;
wherein the plurality of illumination structures and the sheer structure simulate the lighting of an aquatic environment;
wherein the window aquarium kit is configured to mount in a window structure such that the window aquarium kit is visible from the interior and the exterior of a building;

wherein the plurality of decorative puppets comprises one or more aquatic plant puppets, one or more seaweed puppets, one or more bubble puppets, one or more sea grass puppets, one or more rock puppets, one or more seashell puppets, one or more school of dolphins puppets, one or more dolphin puppets, and one or more aquarium fish puppets;

wherein each aquatic plant puppet selected from the one or more aquatic plant puppets is a puppet;

wherein each selected aquatic plant puppet presents an image of one or more indicia that stimulate the sentiment of a naturally occurring plant that is found in an aquatic environment;

wherein each seaweed puppet selected from the one or more seaweed puppets is a puppet;

wherein each selected seaweed puppet presents an image of one or more indicia that stimulate the sentiment of a naturally occurring macroalgae that is found in an aquatic environment;

wherein the naturally occurring macroalgae is commonly referred to as seaweed;

wherein each bubble puppet selected from the one or more bubble puppets is a puppet;

wherein each selected bubble puppet presents an image of one or more indicia that stimulate the sentiment of a physical structure commonly referred to as a bubble;

wherein the bubble puppet selected from the one or more bubble puppets is configured to be suspended within the decorative structure formed by the window aquarium kit;

wherein each sea grass puppet selected from the one or more sea grass puppets is a puppet;

wherein each selected sea grass puppet presents an image of one or more indicia that stimulate the sentiment of a naturally occurring flowering plant that is found in an aquatic environment;

wherein each rock puppet selected from the one or more rock puppets is a puppet;

wherein each selected rock puppet presents an image of one or more indicia that stimulate the sentiment of a physical structure commonly referred to as a rock;

wherein each seashell puppet selected from the one or more seashell puppets is a puppet;

wherein each selected seashell puppet presents an image of one or more indicia that stimulate the sentiment of a physical structure commonly referred to as a seashell;

wherein each school of dolphins puppet selected from the one or more school of dolphins puppets is a puppet;

wherein each selected school of dolphins puppet presents an image of one or more indicia that stimulate the sentiment of a naturally occurring school of animals that are found in an aquatic environment;

wherein the indicia presented for each selected school of dolphins puppet stimulate the sentiment that the selected school of dolphins puppet are being seen from a distance;

wherein each individual dolphin puppet selected from the one or more dolphin puppets is a puppet;

wherein each selected individual dolphin puppet presents an image of one or more indicia that stimulate the sentiment of a single naturally occurring animal that is found in an aquatic environment;

wherein each aquarium fish puppet selected from the one or more aquarium fish puppets is a puppet;

wherein each selected aquarium fish puppet presents an image of one or more indicia that stimulate the sentiment of a single naturally occurring animal that is found in an aquatic environment wherein the position of each decorative puppet selected from the plurality of decorative puppets is selected such that the plurality of decorative puppets are visible through the window structure;

wherein the one or more bubble puppets and the one or more school of dolphins puppets are configured to be suspended within the window structure such that they appear to be floating in water;

wherein the sheer structure is a sheer textile structure;

wherein the sheer structure is configured to be placed between the plurality of decorative puppets and the interior surface of the window structure;

wherein the sheer structure diffuses the light passing through the sheer structure such that the boundaries of each decorative puppet selected from the plurality of decorative puppets is slightly diffused in a manner that is consistent with viewing the selected decorative puppet from underwater;

wherein the sheer structure emulates the lack of clarity of objects as they appear from under water.

2. The window aquarium kit according to claim 1
wherein the window aquarium kit is a kit;
wherein the window aquarium kit is a decorative structure;
wherein the window aquarium kit simulates an aquatic environment;
wherein by simulating an aquatic environment is meant that the window aquarium kit presents an image of indicia that stimulate a sentiment of a naturally occurring aquatic environment in an individual viewing the window aquarium kit.

3. The window aquarium kit according to claim 2 wherein the plurality of decorative puppets and the sea floor structure combine to form the full decorative structure of the window aquarium kit.

4. The window aquarium kit according to claim 3 wherein the plurality of decorative puppets comprises a collection of decorative puppets;
wherein each decorative puppet selected from the plurality of decorative puppets is a puppet;
wherein each selected decorative puppet presents an image of a first set of one or more indicia;
wherein each of the first set one or more indicia stimulates the sentiment of a component of a natural aquatic environment.

5. The window aquarium kit according to claim 4
wherein the sea floor structure is a mat covering;
wherein the form factor of the sea floor structure is selected such that the sea floor structure presents an image of second set of one or more indicia;
wherein each of the second set of one or more indicia stimulates the sentiment of the gravel bed of a natural aquatic environment.

6. The window aquarium kit according to claim 5 wherein the plurality of illumination structures and the sheer structure combine to illuminate the decorative structures of the window aquarium kit.

7. The window aquarium kit according to claim 6
wherein the plurality of illumination structures provides and controls the illumination used to highlight the images presented by the plurality of decorative puppets and the sea floor structure;
wherein each illumination structure selected from the plurality of illumination structures is a lamp;

wherein the plurality of illumination structures combine to present an illumination that is consistent with the appearance of naturally occurring light when viewed from beneath the water.

* * * * *